United States Patent

Ice et al.

[11] Patent Number: 5,758,880
[45] Date of Patent: Jun. 2, 1998

[54] SELF PILOTING SEAL HEAD ASSEMBLY

[75] Inventors: Kevin F. Ice, Concord; Robert S. Holt, Ashland, both of N.H.

[73] Assignee: Freudenberg-NOK General Partnership, Plymouth, Mich.

[21] Appl. No.: 703,949

[22] Filed: Aug. 28, 1996

[51] Int. Cl.[6] .................. F16J 15/34; F16J 15/38
[52] U.S. Cl. ................. 277/375; 277/391; 277/394
[58] Field of Search ..................... 277/42, 43, 88, 277/90

[56] References Cited

U.S. PATENT DOCUMENTS

| | | |
|---|---|---|
| 2,322,834 | 6/1943 | Dornhofer. |
| 2,474,123 | 6/1949 | Schmitz. |
| 2,729,475 | 1/1956 | Chambers, Jr. et al. ............ 277/88 |
| 2,785,913 | 3/1957 | Solari. |
| 2,899,219 | 8/1959 | Payne ................................. 277/43 |
| 3,018,112 | 1/1962 | Amirault et al. ................... 277/42 |
| 3,059,936 | 10/1962 | Barrett ............................... 277/43 |
| 3,160,417 | 12/1964 | Mueller ............................. 277/42 |
| 3,314,681 | 4/1967 | Talamonti ......................... 277/42 |
| 3,492,008 | 1/1970 | Donley ............................. 277/88 |
| 3,554,559 | 1/1971 | Dahlheimer ...................... 277/37 |
| 4,275,889 | 6/1981 | Butler et al. ...................... 277/42 |
| 4,415,167 | 11/1983 | Gits ................................. 277/43 |
| 5,123,660 | 6/1992 | Dahlheimer et al. ............ 277/88 |

FOREIGN PATENT DOCUMENTS

| | | | |
|---|---|---|---|
| 1357122 | 2/1963 | France. | |
| 2216815 | 11/1972 | Germany. | |
| 1206393 | 9/1970 | United Kingdom | 277/88 |
| 2065243 | 6/1981 | United Kingdom | 277/88 |

*Primary Examiner*—William A. Cuchlinski, Jr.
*Assistant Examiner*—John L. Beres
*Attorney, Agent, or Firm*—Dinnin & Dunn, P.C.

[57] ABSTRACT

A self piloting seal assembly for use on a rotatable shaft pump unit, the seal assembly including a seal head assembly in constant contact with a seal seat assembly. The seal head assembly includes an elastomer boot, a spring seat, a ferrule and a spring all disposed around a seal washer. The seal seat assembly includes a ceramic radial seal seat disposed within an elastomer boot member. The seal washer is in constant contact with the seal seat assembly to prevent leakage of any fluid between and around the shaft member.

20 Claims, 3 Drawing Sheets

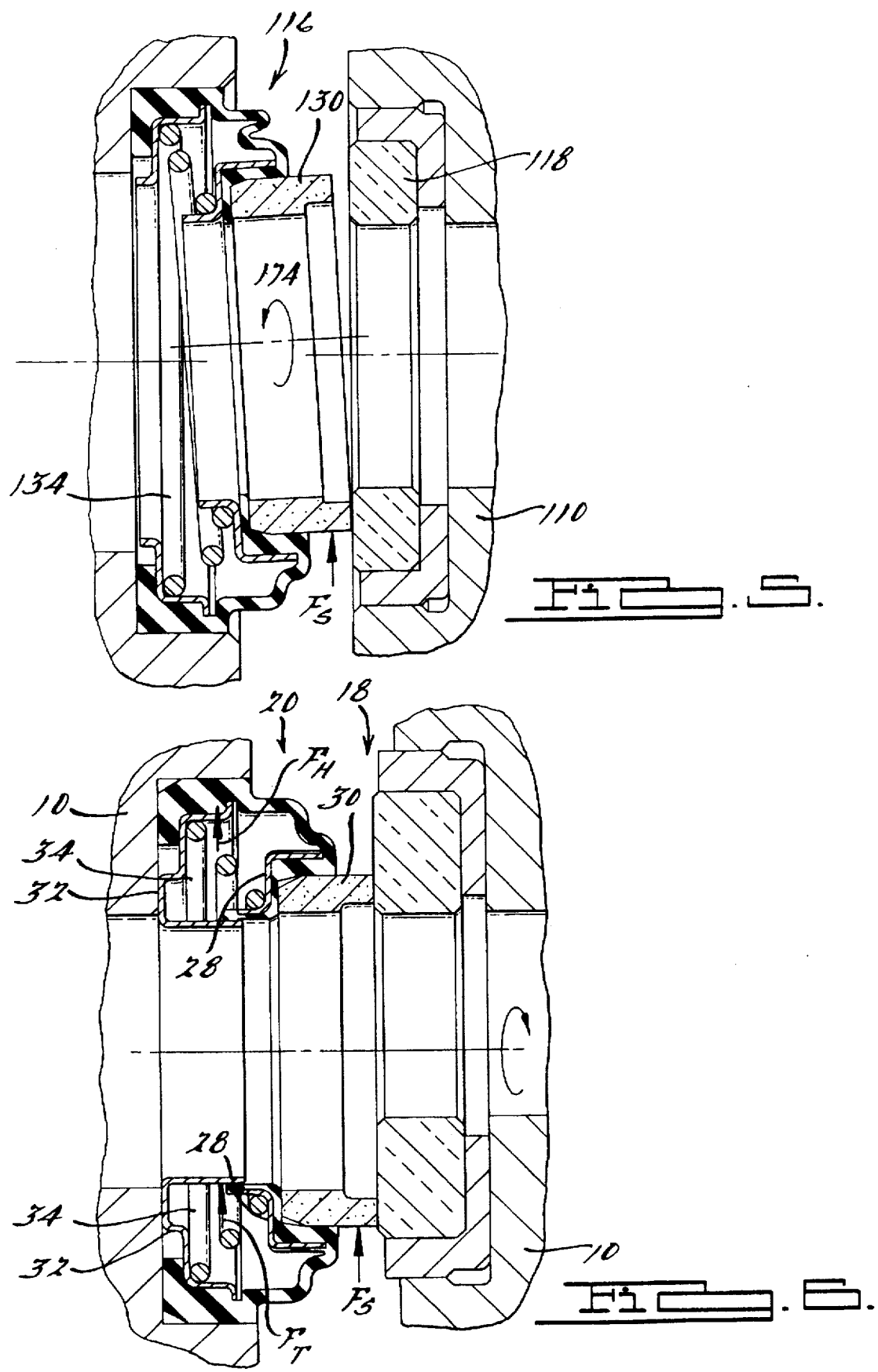

SELF PILOTING SEAL HEAD ASSEMBLY

BACKGROUND OF THE INVENTION

1. Field of the Invention

The present invention relates to seals and sealing, and more particularly, to a self piloting seal head assembly for use on a shaft.

2. Description of the Related Art

Rotary mechanical face seal assemblies commonly used in automotive water pumps and similar relatively low hydraulic pressure sealing applications typically include a sealing boot of a deformable elastomeric material, a seal seat, a sealing washer, a spring for biasing the sealing washer against the seal seat, and arrangement for retaining the components in sealing relation with respect to a stationary housing and rotating shaft pressing through the bore of the housing.

A portion of the axial sealing force results from the sealing boot deflecting from its molded free state to an as used deflected state. The force needed for this deflection normally does not actively contribute to the sealing and if needed will eventually diminish to a negligible level due to relaxation and deterioration of the elastomer. Further, springs which are commonly used in these assemblies usually have nominal spring forces that are significantly higher than the minimum force required to assure proper sealing even after accommodating for normal axial tolerances of the combined components.

Prior art seal devices are adversely effected by variations in seal face lubrication, eccentricity, and runouts, all which cause a side force to result at the seal face. This side force causes a radial displacement and a moment which forces the seal washer to lose seal face contact. Once the force is removed or released, the seal faces will forcibly shut which causes fluid leakage and unwanted noise. Therefore, there is a need in the art for a self piloting seal assembly that will maintain continuous seal face contact through all operating conditions.

SUMMARY OF THE INVENTION

One object of the present invention is to provide a self piloting seal device.

Another object of the present invention is to provide a seal which maintains constant seal face contact at its sealing surface.

It is a further object of the present invention to prevent radial displacement of the seal face by transmitting any side load to the spring seat and subsequently to the housing.

To achieve the foregoing objects, the self piloting seal device includes a spring seat that includes a spring within the spring seat, a boot which is made of an elastomer which is in contact with the spring seat, and a fixed housing. The boot includes a ferrule molded therewithin. The self piloting seal device further includes a seal seat assembly which includes a circumferential seal seat made of a ceramic material. The self piloting seal device also includes a seal washer which is in constant contact with the seal seat assembly.

One advantage of the present invention is that the moderate interference or clearance fit of the spring seat tubular section creates a dampening effect and a piloting advantage. This effect reduces the magnitude of torsional force and radial displacement fluctuations caused by changes in frictional coefficients and/or interfacial contamination.

Another advantage of the present invention is the prevention of radial displacement of the seal washer.

A further advantage of the present invention is the elimination of noise and leakage at the seal interfaces.

Other objects, features and advantages of the present invention will become apparent from the subsequent description and appended claims taken in conjunction with the accompanying drawings.

BRIEF DESCRIPTION OF THE DRAWINGS:

FIG. 5 shows a prior art seal device with a force $F_s$ being applied.

FIG. 6 shows the present invention of a self piloting seal device with a force $F_s$ being applied.

Figure 1:
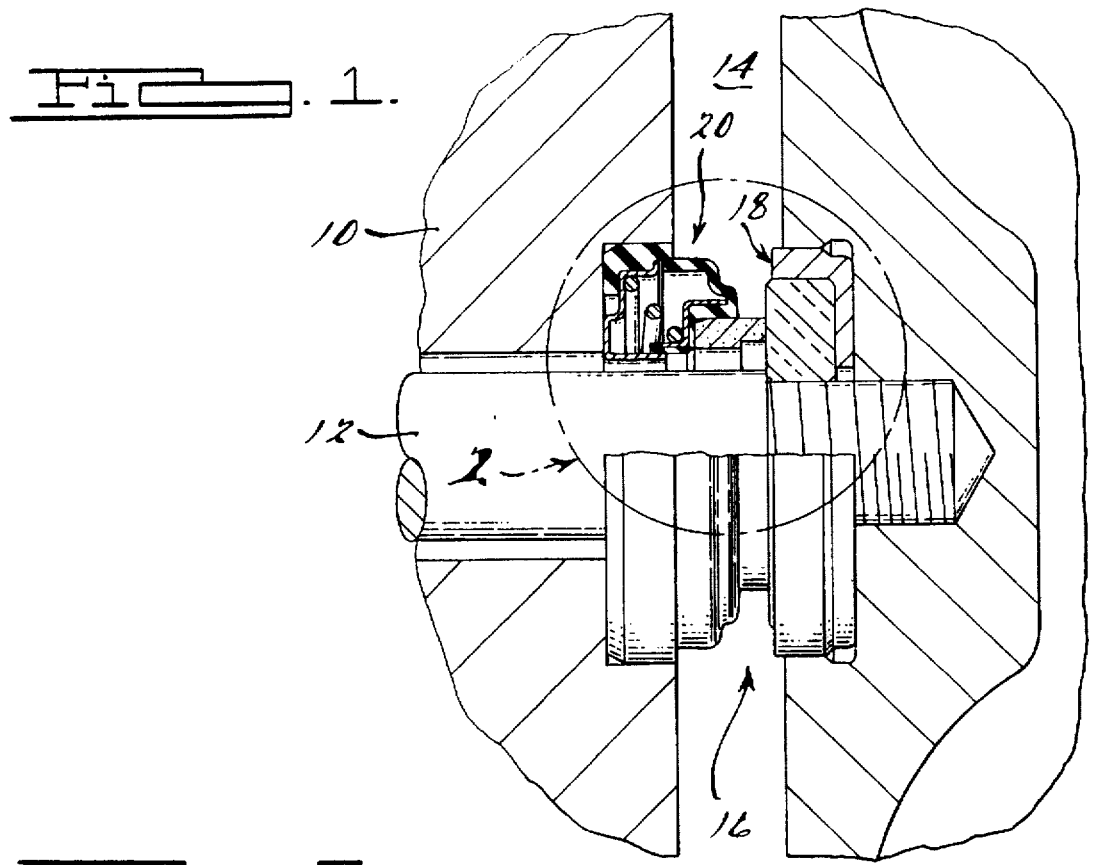
FIG. 1 shows a plan view of the present invention.
Figure 2:
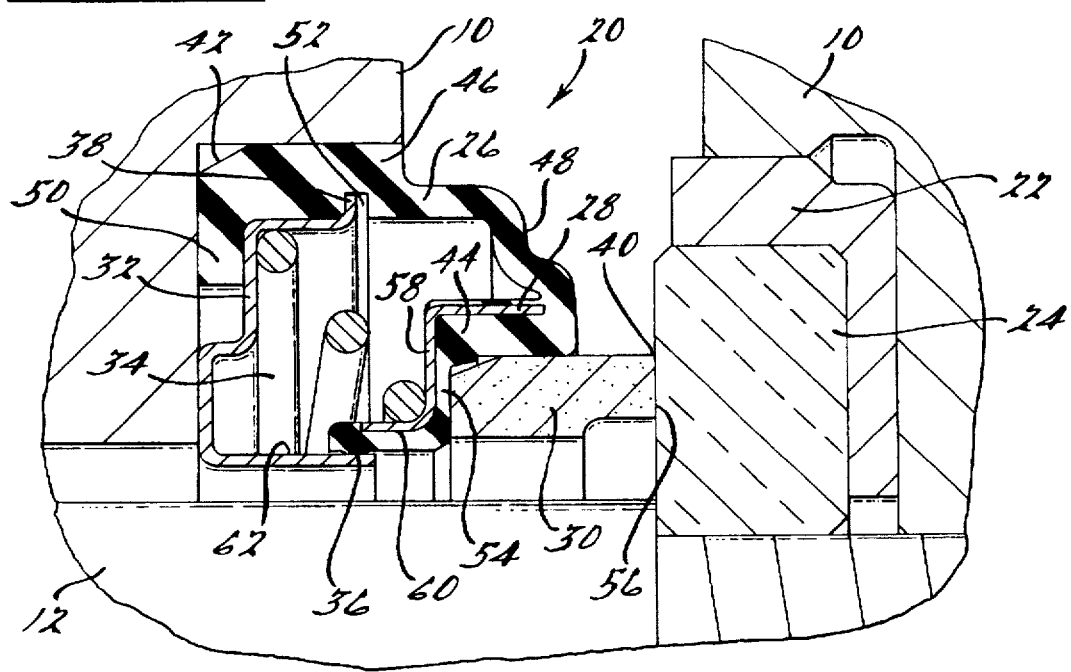
FIG. 2 shows a cross-sectional enlarged view from FIG. 1 of the present invention.
Figure 3:
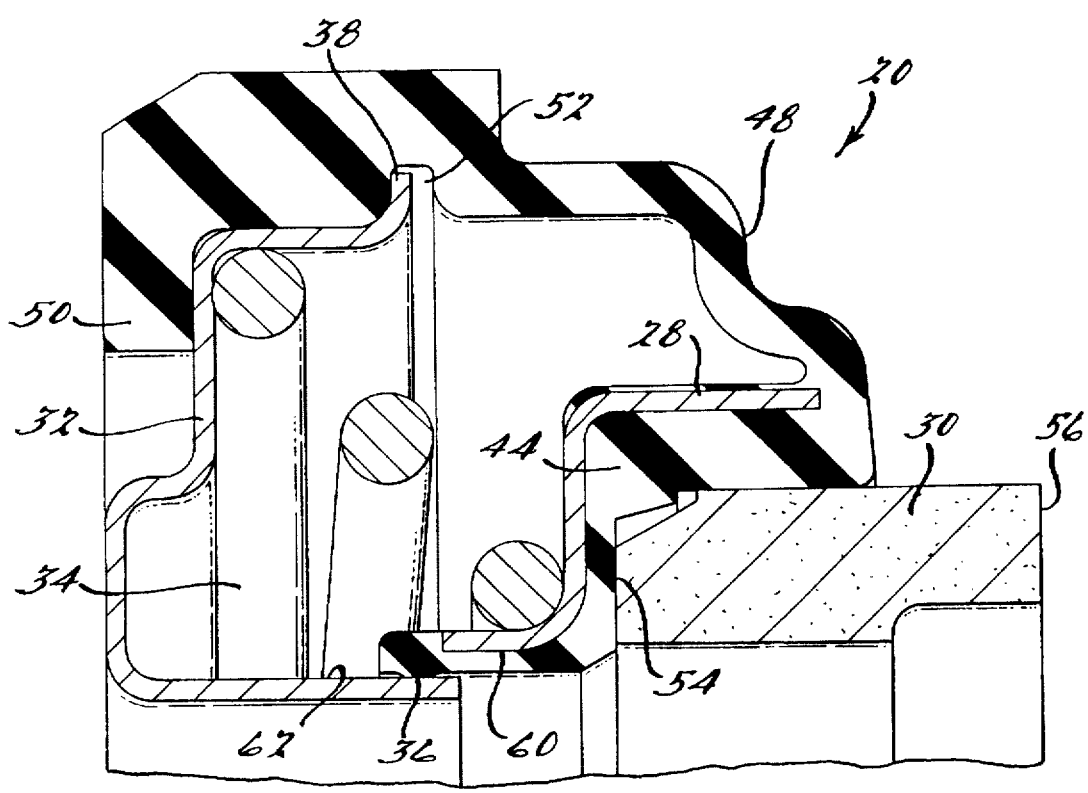
FIG. 3 shows an enlarged cross-sectional view of the seal head.

BEST MODE IN CARRYING OUT THE INVENTION AND DESCRIPTION OF THE PREFERRED EMBODIMENT(S):

Referring to the drawings and FIGS. 1–6, a self piloting seal assembly 16 is shown within a housing 10 surrounding a shaft 12 of a pump such as a water pump of an internal combustion engine. The self piloting seal assembly 16 includes a seal head assembly 20 and a seal seat assembly 18. The self piloting seal assembly 16 will prevent liquid from penetrating from one side of the bore 14 through the seal 16 around the shaft 12 and to the other side of the bore 14. The self piloting seal assembly 16 prevents fluid from leaking from one end of the pump assembly to the lower portion of the pump assembly by the biasing force applied with spring 34 at the sealing interface 40.

The seal head assembly 20 includes a boot 26 which is preferably made of an elastomer, but may be made of any other suitable type of flexible, deformable material capable of withstanding the associated operating conditions of any number of operating environments. The elastomer boot 26 has a circumferential shape and forms the outer surface of the seal head assembly 20 which is secured within the housing 10 by press-fitting into a counter bore of the housing 10. The outer surface portion of the elastomer boot 26 also includes an angled corner 42 which leaves an opening between the housing wall 10 and the elastomer boot 26. The elastomer boot 26 generally has a U-shaped cross-section. The elastomer boot 26 has an inner leg 44 and an outer leg 46. The elastomer boot 26 also includes at least one bellow 48 disposed between the inner leg 44 and the outer leg 46. The bellow 48 of the elastomer boot 26 has an S-like or wave-like cross-section. The outer leg 46 has an inwardly radiating flange 50 upon which the spring seat member 32 is positioned. The outer leg 46 also includes an indentation or channel 52 on its inner surface. The indentation 52 receives and secures the outwardly extending flange 38 of the spring seat member 32. The inner leg 44 of the elastomer boot 26 includes an axial surface 54 upon which the radial seal washer 30 abuts. The inner leg 44 of the elastomer boot 26 includes a protrusion 36. The protrusion 36 is on the outer surface of the inner leg 44.

The seal head assembly 20 also includes a ferrule 28 which is preferably made of a metal material, but may also be made of any ceramic or other hard plastic-type material. The ferrule 28 is molded directly into the inner wall of the elastomer boot member 26 and has an S-shaped cross-section. The ferrule 28 has an axial surface 58 which is parallel to the seal face 56 of the seal washer 30. The ferrule 28 is in contact with the spring 34 which is used to create the biasing force for the seal washer 30.

The seal head assembly 20 also includes a tubular spring seat 32. The spring seat 32 has a generally U-shaped cross-section. The spring seat 32 includes an outwardly extending flange 38 on its outer circumference which engages with the indentation or channel 52 in the inner wall of the elastomer boot 26. This allows for secure attachment of the spring seat 32 to the elastomer boot 26 and collect alignment of the seal head assembly 20 with the seal seat assembly 18. The spring seat 32 is also in contact with the housing 10. The spring seat 32 engages the protrusion 36 at its inner surface. The engagement between the protrusion 36 and spring seat 32 is press-fit or secured by any other appropriate means and it tends to dampen any vibrations which are passed through the seal washer 30, the ferrule 28 and the spring seat 32. The clearance between the outer edge 60 of the ferrule 28 and the inside wall 62 of the spring seat 32 is preferably 0.001 to 0.006 inches, but may be within the range of 0.0001 to 0.060 inches. This small or moderate interference or clearance fit of the spring seat 32 and the inner edge of the ferrule 28 creates a dampening effect and a piloting advantage for the overall seal member. This effect will reduce the magnitude of torsional forces and radial displacement fluctuations which are caused by changes in frictional coefficients and/or interfacial contamination of the seal face 56. The spring seat 32 forms a moderate interference or clearance fit with the ferrule 28 that is attached to the spring 34 which in turn then holds the seal face 56 concentric to the fixed end of the seal head assembly 20.

The seal head assembly 20 also includes a radial seal washer 30 which is press-fitted or secured by any other appropriate means within the elastomer boot 26. The seal washer 30 has a seal seat face 56 which is in constant contact with a seal seat assembly 18. The seal washer 30 may be made of a ceramic material or any other hardened rubber or plastic material depending on the operating conditions the seal washer 30 will be used in. The seal washer 30 is in constant contact with the seal seat assembly 18 though a spring 34 which provides a biasing force.

The self piloting seal assembly 16 also includes a seal seat assembly 18 which includes a ceramic radial seal seat 24 which is circumferentially shaped and is secured within an elastomeric circumferential boot member 22. The boot member 22 is press-fitted or secured by any other appropriate means within a counter bore within an opposite face of the housing 10 from the seal head assembly 20. The ceramic seal seat 24 within the seal seat assembly 18 is in constant contact with the seal face 56 on the seal washer 30 from the seal head assembly 20. It should be noted that the preferred seal seat 24 is made of a ceramic, but other comparable materials may also be used.

Figure 4:
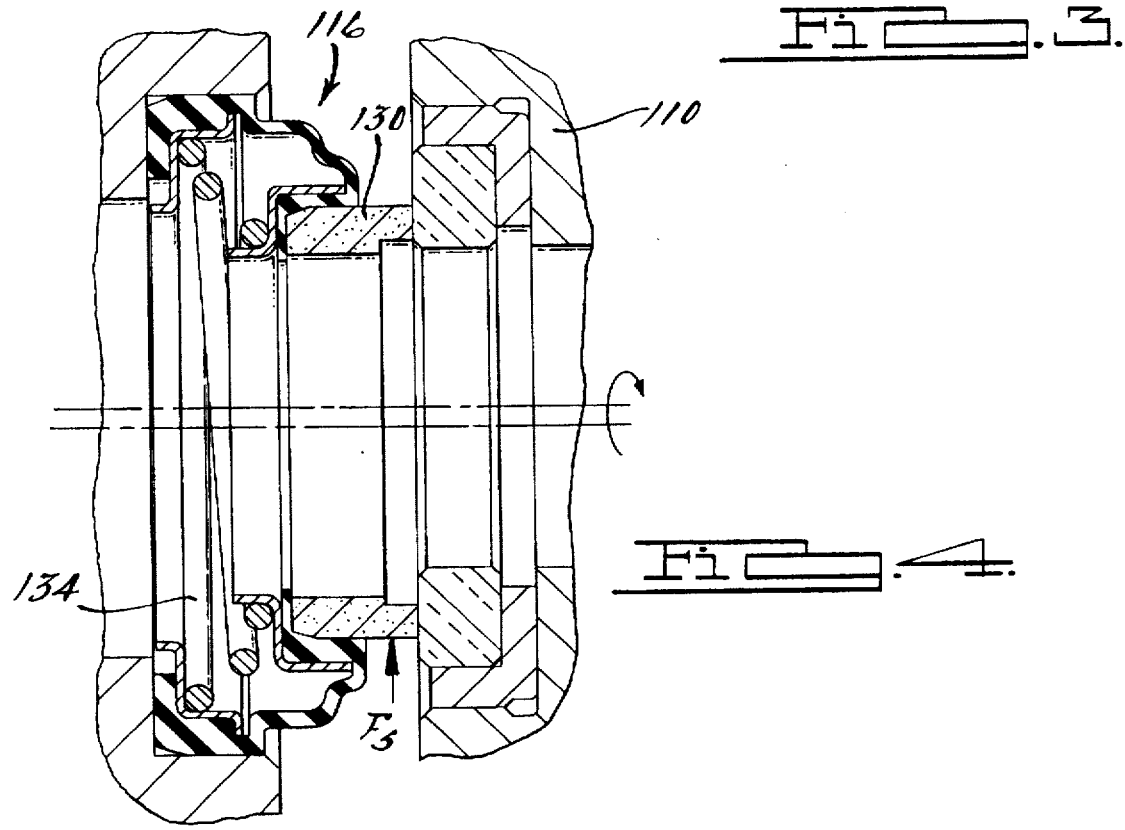
FIG. 4 shows a prior art seal device.

FIGS. 4 and 5 show a prior art seal member 16. FIG. 5 shows the seal assembly 116 with a side force $F_s$ being applied from the bottom. This creates a moment 174 around the spring member 134 which forces the seal washer 130 to disengage from the seal seat 118 creating a space for fluid leakage to occur around the shaft 112. The side force $F_s$ which causes this seal breach may be caused by seal face lubrication variations, eccentricity variations, runouts and other forces found within the housing unit 110. The radial displacement which is caused by such a side force creates the moment around a fixed point in space such that the seal face contact is lost and when the force changes or the seal or the side force is completely removed, this sudden change causes the seal face to slam shut which causes leakage and noise within the housing unit.

FIGS. 6 shows the present invention when a side force $F_s$ is transmitted to the seal washer 30 causing a radial displacement and moment about a fixed point in space. The side force $F_s$ in the present invention is transmitted to the spring seat 32 which is fixed to the housing 10 and subsequently the force $F_T$ that was transferred to the spring seat 32 is transferred to the housing 10 as $F_H$. Therefore, the side force $F_s$ will equal the spring seat force $F_T$ which will equal the force $F_H$ being applied to the housing. This will prevent any radial displacement from occurring at the seal washer 30 and keep the seal face 56 in constant contact with the seal seat assembly 18. This will stop any opening or closing of the seal face which will eliminate any associated noise and leakage within the housing unit.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the claims, the present invention may be practiced other than as specifically described.

What is claimed is:

1. A self piloting seal device, said seal device including:

a tubular spring seat;

a spring in contact with said spring seat;

a boot in contact with said spring seat and a fixed housing, said boot includes a bellow, said boot includes a ferrule molded within said boot, said ferrule is a predetermined distance from an edge wall of said spring seat; said spring seat forms a clearance fit with said ferrule;

a seal seat assembly, said seal seat assembly includes a circumferential seal seat; and a seal washer within said boot, said seal washer having a seal face which is in constant contact with said seal seat, said clearance fit holds said seal face concentric to said fixed end of said boot and said spring seat.

2. The self piloting seal device of claim 1 wherein said boot is made of an elastomer.

3. The self piloting seal device of claim 1 wherein said seal seat is a ceramic.

4. The self piloting seal device of claim 1 wherein said seal washer is made of a ceramic.

5. The self piloting seal device of claim 1 wherein said predetermined distance is between approximately 0.001 inch to 0.006 inch.

6. The self piloting seal device of claim 1 wherein said boot is between said ferrule and said spring seat.

7. The self piloting seal device of claim 6 further including a protrusion on said boot.

8. The self piloting seal device of claim 7 wherein said protrusion is in contact with said spring seat.

9. A self piloting seal device, said seal device including:

a seal head assembly which is disposed within a housing member;

a seal seat assembly which is disposed within an opposite wall of said housing member directly across from said seal head assembly;

said seal head assembly being in constant contact with said seal seat assembly;

said seal head assembly including a boot member generally having a U-shaped cross-section, said boot including a bellow, said boot member including a protrusion on an outer surface of an inside leg of said boot member, said seal head assembly further including a spring seat member generally having a U-shaped cross-section connected to said boot member at both end walls of said spring seat member, said spring seat member in constant engagement with said protrusion of said boot member;

said boot member further including a ferrule having a leg portion which is in contact with a spring, an opposite end of said spring is in contact with and seated on said spring seat member, said ferrule being a predetermined distance from an inner edge of spring seat wall;

a circumferential seal washer within an indentation of said boot member; and said seal seat assembly including a circumferential seal seat within a boot assembly, said seal washer of said boot member having a seal face which is in constant contact with said seal seat.

10. The self piloting seal device of claim 9 wherein said boot member is made of an elastomer.

11. The self piloting seal device of claim 9 wherein said seal washer of said boot member is a rubber material.

12. The self piloting seal device of claim 9 wherein said boot member is disposed between said ferrule and said spring seat member.

13. The self piloting seal device of claim 9 wherein said predetermined distance is between 0.001 and 0.006 inches.

14. The self piloting seal device of claim 9 wherein said seal seat is made of a ceramic-type material.

15. The self piloting seal device of claim 9 wherein said boot member includes an angled corner.

16. The self piloting seal device of claim 9 wherein said boot member includes a flange portion for receiving said spring seat member, said spring seat member interengages with said boot member for a press-fit within said seal head assembly.

17. The self piloting seal device of claim 9 wherein said spring biases the seal washer into direct constant contact with the seal seat to prevent liquids from flowing around a shaft through a bore in the housing.

18. A self piloting seal device for use on a shaft within a pump unit, said self piloting seal device comprising:

a seal head member and a seal seat member which work in unison to surround the shaft to prevent leakage;

said seal head member includes an elastomer boot member, said boot member includes an outer leg and an inner leg, said outer leg includes an inwardly radiating flange, an inner surface of said outer leg includes an indentation, said inner leg includes an axial surface and a protrusion, said boot member includes at least one bellow disposed between said outer and inner leg;

a tubular spring seat member in contact with said inner surface of said outer leg of said boot member and in contact with an inner surface of said inner leg of said boot member, an inner wall of said spring seat member in constant contact with said protrusion of said inner leg, said spring seat member includes an outwardly extending flange which is secured within said indentation of said outer leg;

a ferrule molded within said inner leg of said boot member, said ferrule having an axial surface, said ferrule is a predetermined distance from said inner wall of said spring seat member;

a spring disposed radially within said spring seat member, said spring is in constant contact with said spring seat member and said ferrule; and a radial seal washer disposed within said boot member, said radial seal washer includes a seal face which is in constant contact with said seal seat member, said seal seat member includes a circumferential seal seat, said spring provides a biasing force to keep said radial seal washer in constant contact with said seal seat.

19. The self piloting seal device of claim 18 wherein said predetermined distance is between approximately 0.001 inch to 0.006 inch.

20. The self piloting seal device of claim 18 wherein said boot member is disposed between said ferrule and said spring seat member.

\* \* \* \* \*